July 11, 1961  C. J. LOECHL  2,991,824
RECESSED END GYPSUM BOARD AND PROCESS OF MANUFACTURE
Filed Aug. 29, 1957  2 Sheets-Sheet 1
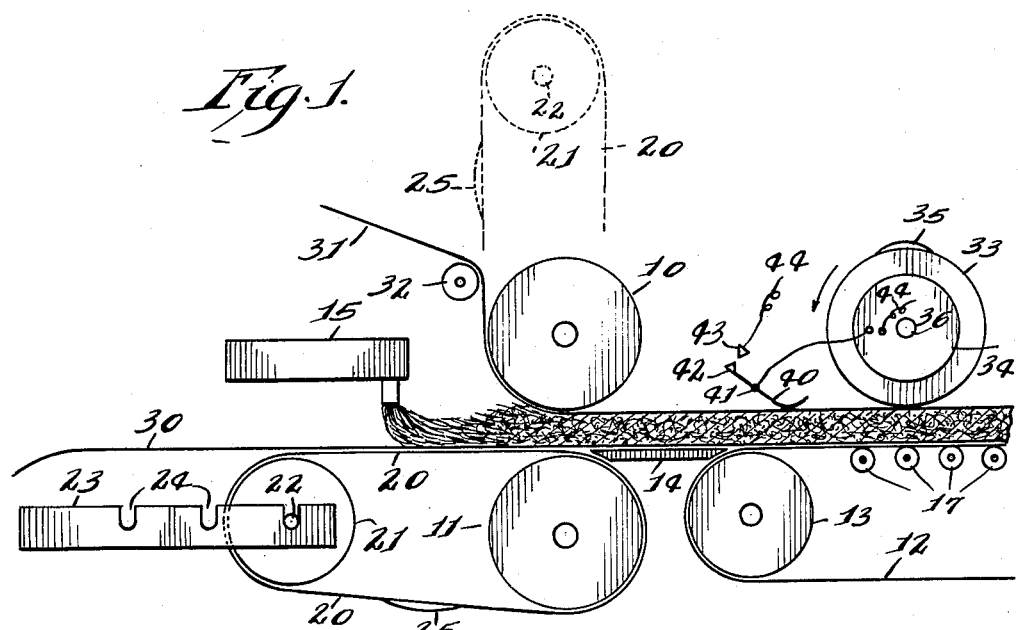
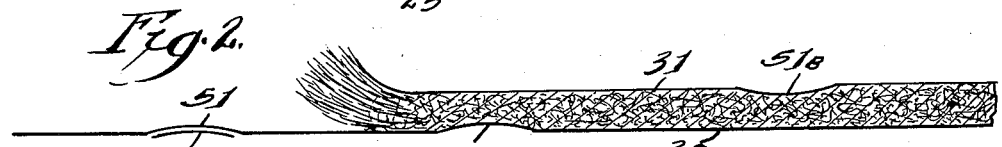
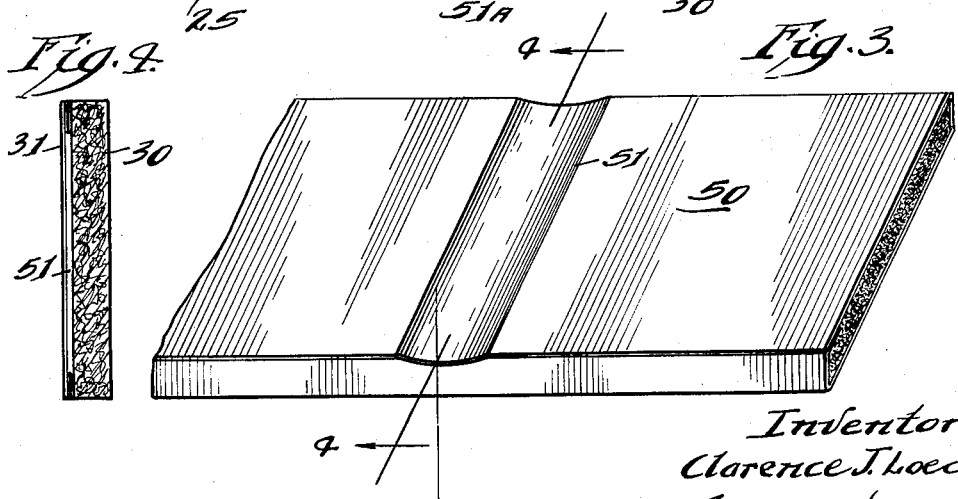
Inventor:
Clarence J. Loechl.
By. Edw. A. Hampson
Attorney.

July 11, 1961 C. J. LOECHL 2,991,824
RECESSED END GYPSUM BOARD AND PROCESS OF MANUFACTURE
Filed Aug. 29, 1957 2 Sheets-Sheet 2
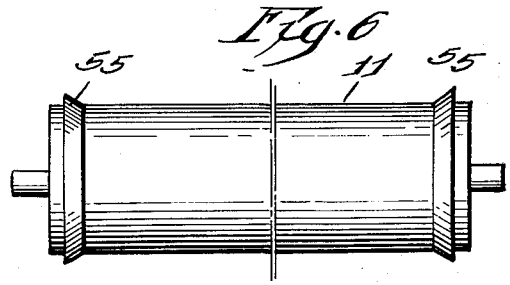
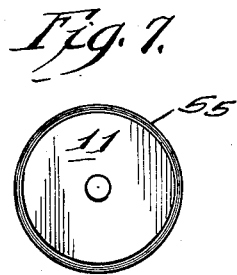
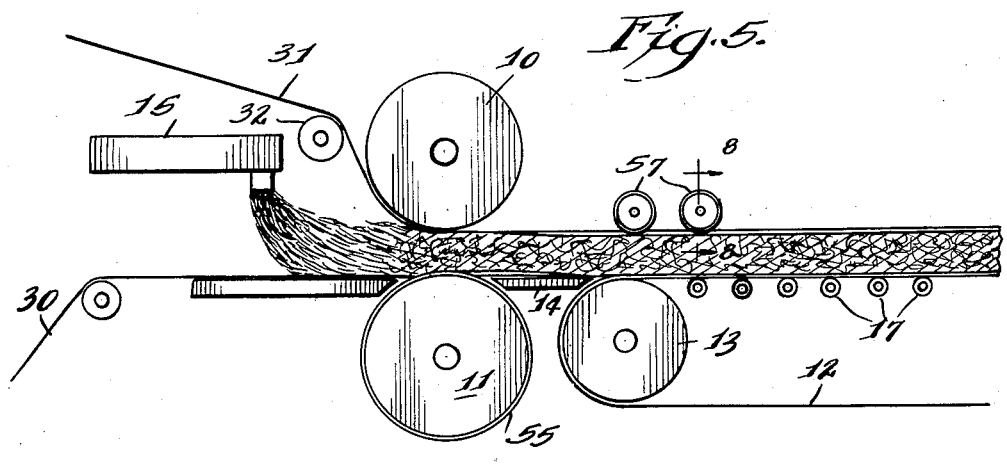
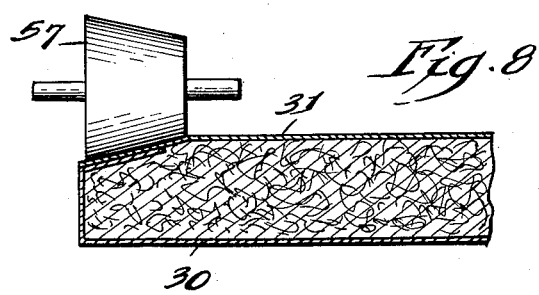
Inventor:
Clarence J. Loechl.
By. Edw. A. Hampson
Attorney.

United States Patent Office 2,991,824
Patented July 11, 1961

2,991,824
RECESSED END GYPSUM BOARD AND PROCESS OF MANUFACTURE
Clarence J. Loechl, Arlington Heights, Ill., assignor to The Celotex Corporation, Chicago, Ill., a corporation of Delaware
Filed Aug. 29, 1957, Ser. No. 681,000
7 Claims. (Cl. 154—1.25)

The invention hereof is directed to the production of a gypsum wallboard product provided at its ends with edge recesses. Such edge recesses, as commonly provided along side edges of gypsum wallboard, are usually, actually, tapered edge portions approximately two and one-half inches in width and tapering from the board face downwardly to a depth of approximately 0.04-inch at the edge of the board. Two boards having such tapered or recessed edge portions when erected side by side provide a very shallow V-form depression in which may be bedded a suitable joint covering tape which is then covered over flush with the surfaces of the boards with suitable joint cement so as to provide a smooth, so-called dry wall finish.

While in the past it has been common that gypsum wallboards are available with such side edge recesses, so far as is known there is no gypsum wallboard produced and available having such recesses at their end edges, that is, extending transverse of the width of the boards.

So far as is known, all gypsum wallboards are made by a continuous process according to which there is produced in effect an endless board of standard width, which endless board is suitably cut to length in the process of manufacture to provide gypsum wallboards of the desired length.

The machines producing wallboard currently operate at a rate of 100 feet and over per minute, that is, they will produce a length of 100 feet or more of such continuous board per minute. To form across such continuously produced board being produced at the rate referred to, suitably spaced, transverse depressions or recesses which will provide the desired end recesses on the finished board lengths, when the continuous sheet is suitably severed, has proved to be extremely difficult because of the speed of operation of the machines producing the board, and especially so due to the nature of the material being acted upon.

It is a principal object of the invention hereof to provide an apparatus which will successfully form, extending transversely of the continuously produced base sheet, the requisite recesses or depressions whereby, when such are cut into lengths, each such cut length will be provided with an end edge recess. It is a further object of the invention hereof to provide gypsum wallboard which at its end edges is recessed, and which board is produced by the method involved in the operation of the disclosed apparatus for producing gypsum wallboard.

It is a still further object of the invention hereof to provide a new and novel method of producing gypsum wallboard provided with end edge recesses.

The apparatus hereof is illustrated in the accompanying drawings which are diagrammatic for the purpose of presenting the features of construction in a clear and unencumbered manner. Those skilled in the art of the manufacture of gypsum wallboards will readily perceive, upon following the description of the drawings, the operating principles involved, and it is assumed may readily adapt such principles to a board-producing apparatus.

In the accompanying drawings, FIGURE 1 is a side elevation of the apparatus;

FIGURE 2 is a schematic drawing to illustrate the steps of the formation of the desired recesses;

FIGURE 3 is a fragmentary view of a short section of the continuously produced board;

FIGURE 4 is a section taken on line 4—4 of FIGURE 3;

FIGURE 5 is a side elevation of the machine showing a further phase of the invention;

FIGURE 6 is a detail view of a master roll;

FIGURE 7 is an end elevation of the master roll of FIGURE 6; and

FIGURE 8 is a detail illustrating the action of the edge rolls.

In the accompanying drawings, while the general apparatus is shown separately in each of FIGURES 1 and 5, it is to be understood that such illustration has been made only for the sake of clearness, and that the constructions and mode of operation of the apparatus of FIGURE 5 may, if desired, be incorporated into the apparatus and construction shown in FIGURE 1.

Basically the machine or apparatus for producing the gypsum wallboard hereof is the conventional apparatus, so far as is known, as that used by all gypsum board manufacturers. It will be understood, of course, that the machine is provided with suitable supporting members or bases, and that the various rolls thereof are suitably journaled, but since all such features are well known to all those skilled in the art, specific illustration thereof has been omitted from the drawings for the sake of clarity.

The basic machine comprises a pair of master rolls, the top roll identified by the numeral 10 and the bottom roll by numeral 11. These rolls are suitably spaced according to the thickness of the board to be produced, and they serve to control the thickness of the product and to consolidate the elements thereof into finished board form. Board which is formed between master rolls 10 and 11 passes over a transfer plate 14 onto a setting belt 12 which is trained around belt roll 13. To support the upper run of setting belt 12 there may be provided suitable support rolls 17 which support the belt and board being carried thereon so that the board surfaces thereof are plane. Face papers 30 and 31 are suitably fed to pass between master rolls 10 and 11 and depending upon circumstances, such may be trained over directing rolls 32 as they are being fed to the master rolls. A mixer 15 is positioned over sheet 30 to discharge gypsum slurry onto sheet 30 as it is approaching the master rolls. Between the master rolls, this gypsum slurry is spread out to the required uniform thickness across the width of the base sheet 30, and sheet 31 is applied to the top surface thereof.

While the operation is not specifically illustrated, since it would only unnecessarily encumber the drawings, it is common that the edges of base sheet 30 are suitably scored and the edges are turned upwardly at right angles to the general plane of the sheet, whereupon the extreme edge portions are folded inwardly to in effect provide a container for the gypsum slurry thereon. As the board, in its formation, passes between master rolls 10 and 11, sheet 31, the edge portions of which have been suitably coated with adhesive, is brought into contact with the retroverted portions of base sheet 30 to complete the enclosure of the slurry core within the paper facings.

So far as it is known it is the general practice that the base sheet 30 is the sheet which is the face sheet of the finished board and sheet 31 is the sheet which is the back surface of the finished board. For the purposes hereof such relationship of the facing sheets is reversed. Sheet 30 is the back sheet of the finished board and sheet 31 is the face sheet of the finished board. The recess which constitutes the end edge recesses of the finished board hereof is provided in the top surface of the composited sheet produced, that is, the face sheet is the sheet which is displaced to provide the desired recesses in the face of the finished product at its end edges.

For providing the desired end edge recesses there is provided novel equipment which is integrated into the construction of the ordinary gypsum board producing apparatus. The added construction comprises a forming conveyer roll 21 over which there is trained a forming conveyer which also passes around bottom master roll 11. This forming conveyer is provided with a cross mold member 25 which is suitably secured to the conveyer member 20, preferably in a readily detachable manner. Generally, this forming conveyer unit will be positioned whereby its upper run is at the same level and in the same plane as the tangent to a perpendicular through the axis of the master roll 11, but it will be readily apparent that the upper run of forming conveyer 20 may, if desired, be inclined either above or below such tangent but, of course, with the limitation that the inclination must not be such that it cannot properly receive the gypsum slurry from the mixer 15 and feed such to between papers 30 and 31 as they pass through the master rolls.

Forming conveyer 20 has a total length which is that of the gypsum wallboard to be produced, so that for each complete traverse of forming conveyer 20 the mold strip 25 shall make one impression in the under side of the continuously formed board.

Assuming, for example, that forming conveyer 20, as shown, has an overall length of eight feet, it will form in the board as it is produced a depression or recess every eight feet of the length thereof so that when the continuously produced board is cut medially of the formed recess, there will be provided gypsum wallboards of a length of eight feet having end edge recesses. It will, of course, be understood that molding strip 25 mounted to forming conveyer 20 is twice the width of an individual recess provided at the end edge of a finished wallboard, so that when the cut is made centrally of the width of the formed recess, each individual wallboard will have its end edge recess of appropriate width which, of course, is one-half of the width of the total recess as formed in the continuously produced board.

In order that wallboards of other lengths may be likewise produced, there is provided a mounting for forming conveyor roll 21 whereby such may be mounted at different distances from the center of master roll 11. This is provided by means of a bearing member 23 which is provided with spaced slots 24 in which the shaft 22 of roll 21 may be mounted. Assuming that the spacing of slots 24 is one foot, it will be evident, if the shaft of roll 21 is mounted in slot 24 next to the one as shown in the drawings, that then by substituting a forming conveyer 20 which is ten feet in overall length, trained over roll 21 and master roll 11 and provided with mold strip 25, that such in each traverse thereof will form a depression in the produced board at recurring ten foot intervals. Bearing slots 24 may be provided as desired for different mountings of forming conveyer roll 21, and by the utilization of forming conveyers 20 of appropriate length, depressions can be provided in the board as it is being formed with regular spacing as may be desired in accordance with the length of the forming conveyer belt currently in use.

To explain the action involved in producing the desired end edge recesses, reference is made to FIGURE 2 wherein such is illustrated schematically. Assuming that the apparatus above described is operating, it will be apparent that as mold strip 25, in its progress, comes up under paper 30, that paper 30 will be more or less draped thereover, as shown at 51. As the components of the board progress the gypsum slurry will be deposited on and over this raised portion of sheet 30, and as the composite of sheets 30 and 31 with interposed gypsum slurry passes between the master rolls, the bottom sheet 30 and the slurry core will be molded to the curved form of molding strip 25. As soon as the composite is so molded, further progress of forming conveyer 20 causes molding strip 25 to recede from the under side of the formed sheet as the conveyer progresses around master roll 11, and accordingly the molded composite is no longer supported at its recessed portion, as at 51a. The board, as it is continuously formed, passes over transfer plate 14 and onto setting belt 12, during which interval the extremely plastic board is unsupported in the region where the recess has been formed in its bottom face. Due to the extremely plastic nature of the formed sheet, this unsupported portion quickly tends to settle to a supported position which, of course, is that of the plane of the top surface of transfer plate 14 and setting belt 12. Due to the fact that the composite board is thinner in that area where the depression had been formed in its bottom face, it follows, when the formed sheet settles to the level or plane of support, that the depression which had been formed in the bottom face is transferred to the top face whereby there is provided in the top face of the composite a depression, as at 51b. It is, of course, understood that as the formed board progresses beyond the point where the recess has been transferred from the under face to the top face, that the gypsum core sets, the continuously produced sheet is cut into lengths by suitable mechanism and the board then passes into the drier to result in the end product.

A short section of the continuously formed board, to illustrate the depression provided in its top surface, is shown in FIGURE 3. Section line 4—4 positioned medially of recess 51 indicates the cutting line for subdividing the continuously produced board into individual wallboards. In FIGURE 4 the construction of the board, as heretofore described, is illustrated to show the manner in which the edge portions of sheet 30 are folded and the manner in which sheet 31 is applied to and adhered to the retroverted portions of sheet 30.

It will be readily apparent, should it be desired to directly form the depression 51 in the top surface of the sheet, that the structure comprising forming conveyer 20, its associated roll 21, etc., may be mounted above upper master roll 10 with conveyer 20 trained therearound as is shown by the dotted line portions of FIGURE 1, indicating the possibility of such alternative arrangement of the device. In such case, of course, it will be readily understood that as mold strip 25 passes around master roll 10, the depression 51 will be formed in the top face of the board being produced, and since such alternative construction will be clearly obvious to those skilled in the art, such will not be further described.

It is felt that the apparatus as described will satisfactorily produce the desired wallboards having recessed end edges, but it may be desired, at least in some circumstances, to assure that the face recess 51 is fully and completely formed, to incorporate in the device auxiliary equipment to assure such condition. Accordingly, if deemed advisable for the purpose of producing perfect depressions 51, there may be mounted over the setting conveyer an auxiliary device which will be described. This comprises a mold roll 33 mounted on shaft 36 and carrying a molding strip 35. This mold roll 33 is driven by means of an intermittent clutch mechanism 34, no details of which are shown since this type of clutch is readily available. The function of the clutch 34 is to cause mold roll 33 to be rotated at properly spaced intervals so that mold strip 35 will contact the preformed depressions, such as indicated at 51b, to assure that they are properly and accurately formed and to assure that each of such is identical as shaped by molding strip 35. To effect the intermittent actuation of clutch 34, there may be provided a feeler or sensing member, such as 40, pivoted at 41 and carrying a contact 42. As the curved outer end of sensing member 40 senses a formed depression in the surface of the board it will, through clockwise motion, cause contact 42 to contact contact 43 which will complete the circuit from power supply 44 to energize the clutch 34 for proper timed rotation of mold roll 33.

If it is desired to form edge recesses along the side edges of the wallboard, the apparatus diagrammatically described in FIGURE 5 may be utilized. However, if it is desired to provide both end edge and side edge recesses, then the constructional features of FIGURE 5 may be integrated into the construction of the apparatus of FIGURE 1 so that the such composite apparatus will form both end edge and side edge recesses.

The general operation of the apparatus of FIGURE 5 in forming gypsum wallboard is as described in connection with the description of the apparatus in FIGURE 1. For forming the edge recesses bottom master roll 11 has suitably positioned, adjacent its respective ends, suitable strips of material 55 which encircle the roll and are of a width and contour to form the desired edge recesses. Actually to form tapered edge recesses, as previously referred to, each of such strips will be approximately two and one-half inches wide and will taper from its inward edge outwardly from substantially nothing to a thickness of 0.04-inch. When master roll 11 is provided with molding strips 55, as just referred to, it is obvious that as cover sheet 30 passes between master rolls 10 and 11, the outer edges of the formed board will be elevated at its edges from the surface of the master roll 11 in accordance with the described dimensions of the molding strips 55.

As the formed board issues from between the master rolls it is, of course, in a quite plastic condition, and as it progresses onto the transfer plate 14 and setting conveyer 12 the action of gravity will serve to cause the unsupported extreme edge portions of the formed board to sink to the extent that the lower face of the formed board is a plane surface from edge to edge thereof. It, of course, follows, when such edge portions of the formed board sink, as referred to, that correspondingly the upper edge portion will likewise sink and accordingly the tapered face originally formed at the under side of the sheet transfers to the upper side thereof.

Alternatively, molding strips 55 may be applied to the upper master roll 10, in which case the side edge recesses are directly formed at the edges on the upper face of the formed board and this may be deemed advisable, at least in some cases, to avoid any interference between the procedure of forming the edge end recesses and the side edge recesses.

To assure that the profile of the upper surface of the edge recess formed is true and of proper dimension, there may be mounted along the edges of the machine, form rolls such as 57 which, across the width thereof, taper as indicated to correspond to the desired width and inclination of the top surface of the recessed edge portion of the board. It is obvious, as the board proceeds on setting conveyer 12, that as the edge portions pass under the form rolls 57 the desired contour of the recessed edge portion, in accordance with the form of such forming rolls, will be assured.

It is to be understood, of course, that the illustration of the accompanying drawings and the foregoing description thereof is all what might be termed diagrammatic or schematic, that is, the purpose thereof is merely to convey the information as to the methods of obtaining the desired result and with respect to apparatus whereby such methods may be accomplished. Those skilled in the art within the scope of the basic disclosures hereof may readily design or adapt such in various forms for the practice of the methods disclosing and for carrying out such methods, and it is comprehended that the purpose of the disclosures hereof is that of accomplishing such result. Accordingly, it is desired that protection hereunder shall not be limited to the specific disclosures thereof but that such shall, within the scope of the appended claims, extend to the various exemplifications and variations of the basic or general features of the inventions hereof as such are taught and disclosed to those skilled in the art to which the inventions hereof appertain.

I claim:

1. The method of forming a face recess in a board form product wherein, in the process of production of the product while it is in plastic condition and comprising, while forming the product, the steps of molding a recess in the downwardly directed bottom face thereof, supporting the bottom face of the formed product, exclusive of the molded recessed portion thereof, and maintaining the product, so supported in its plastic condition, while the force of gravity results in the sinking of the recessed portion to supported position in the plane of the supported face of the product with concomitant transfer of the molded recess from the bottom face to the top face of the product.

2. The method of forming a face recess in a product wherein, in the process of production of the product while it is in plastic condition and comprising, while forming the product, the steps of molding a recess in the downwardly directed face thereof, supporting the bottom face of the formed product, exclusive of the molded recessed portion thereof, maintaining the product, so supported in its plastic condition, while the force of gravity results in the sinking of the recessed portion to supported position in the plane of the supported face of the product with concomitant transfer of the molded recess from the bottom face to the top face of the product, and impressing in the thus formed recess in the top face of the product a tool, the surface contour of which is substantially the obverse of the surface of the recess first formed in the downwardly directed face of the product.

3. The method of producing gypsum wall board with recesses at the opposite side edges thereof and comprising the steps of encasing a continuously formed ribbon of gypsum slurry while it is in plastic condition in a paper casing constituting the top and bottom faces and side edges thereof, just prior to such encasement and during such step, displacing an edge portion thereof upwardly supporting the formed sheet, excepting the theretofore displaced strip section, maintaining the formed sheet so supported while the mass thereof remains plastic and while the force of gravity causes the displaced strip sections to sink and concurrently transfer the displacement thereof to the opposite surface and thereafter smoothing the displaced portion of the upper surface of the sheet to the obverse of the contour of the originally displaced edge portion of the board.

4. Apparatus for producing edge recessed gypsum wallboard and comprising a pair of master rolls, means feeding top and bottom face sheets thereto and means depositing gypsum slurry to the inner face of one of the sheets and between the two sheets and a setting conveyer means beyond the master rolls and receiving the endless sheet issuing from the master rolls and an endless forming conveyer over which is fed the facing sheet on which the gypsum slurry is deposited, the endless forming conveyer trained over spaced rolls, one of which is one of said master rolls, a molding strip mounted to the outer surface of and extending across the width of the forming conveyer, the length of the forming conveyer being the length of individual wallboard sheets to be produced whereby the molding strip will impress a recess transversely of a facing sheet, across its width at intervals corresponding to length of the individual wallboards to be produced.

5. Apparatus as claimed in claim 4 and provided beyond the master rolls with means moldingly contacting the surface of the formed sheet over the transverse recesses in the board surface, the contacting surface of the means being of the same shape as that of the molding surface of the molding strip.

6. Apparatus as claimed in claim 5 including sensing means activated from the board surface and actuating means actuating the means moldingly contacting the board surface, the sensing means activatively connecting to the actuating means.

7. The method of continuous manufacture of gypsum wallboard provided with face recesses at its end edges and comprising the steps, while continuously forming gypsum wallboard in a plastic condition, molding a recess in the bottom face across the width thereof, moving the molded board, exclusive of the molded recess portion, to supported position, maintaining such plastic condition of the board while the unsupported recessed portion sinks by gravity to the plane of the supported face of the board, thereby transferring the recess to the opposite face of the board and the board acquires initial set, and severing the board transversely medially of the recessed portion and thereby constituting individualized gypsum wallboards having end edge recesses at a face thereof.

References Cited in the file of this patent

UNITED STATES PATENTS

| | | |
|---|---|---|
| 2,006,528 | Walper | July 2, 1935 |
| 2,044,234 | Walper | June 16, 1936 |
| 2,090,084 | Walper | Aug. 17, 1937 |
| 2,168,803 | Page | Aug. 8, 1939 |
| 2,238,017 | Duncan | Apr. 8, 1941 |
| 2,246,987 | Roos | June 24, 1941 |
| 2,537,509 | Camp | Jan. 9, 1951 |